United States Patent [19]
Peng

[11] Patent Number: 5,503,301
[45] Date of Patent: Apr. 2, 1996

[54] COMPACT DISC DISPENSER

[76] Inventor: Jung C. Peng, P. O. Box 82-144, Taipei, Taiwan

[21] Appl. No.: 229,196
[22] Filed: Apr. 18, 1994
[51] Int. Cl.⁶ .................................... B65G 59/00
[52] U.S. Cl. ............................. 221/282; 211/71; 248/131
[58] Field of Search .......................... 221/92, 130, 282; 248/441.1, 127, 131, 161, 423; 211/71, 49.1, 81, 78; 312/9.1

[56] References Cited

U.S. PATENT DOCUMENTS

| | | | |
|---|---|---|---|
| 2,521,355 | 9/1950 | Ford | 211/81 |
| 4,187,948 | 2/1980 | Perrella | 211/71 |
| 4,923,154 | 5/1990 | Konkel | 248/131 |

Primary Examiner—Kenneth Noland
Attorney, Agent, or Firm—Alfred Lei

[57] ABSTRACT

A compact disc dispenser including a base formed with a hole at an corner, and a plurality of holders each including a supporting plate and a fixing plate which is integral with and makes an acute angle with the supporting plate thereby forming a spine between the supporting plate and the fixing plate, the fixing plate being formed at both sides with a hook portion adapted for engaging a cover of a compact disc container, each of the holders being provided at an corner of the spine with an axle formed with a recess at an upper end and a stem at a lower end, the recess of one of the holders being adapted to receive the stem of another end of the holders.

1 Claim, 3 Drawing Sheets

COMPACT DISC DISPENSER

BACKGROUND OF THE INVENTION

Devices for storing compact disks are well known in the art. However, none of the prior art devices available to the public has adequately met all of the goals of: simplicity of design; visual aesthetics; ready accessibility of contents; reliable operations mechanisms; visual accessibility of label information; and reasonable density of storage. Improvements in each of these areas is particularly desirable in the industry. Furthermore, it is of extreme value to provide a device which combines all of the desirable characteristics set forth above.

SUMMARY OF THE INVENTION

This invention relates to an improved compact disc dispenser.

It is the primary object of the present invention to provide a compact disc dispenser which is easy to operate.

It is another object of the present invention to provide a compact disc dispenser which is simple in construction.

It is still another object of the present invention to provide a compact disc dispenser which is low in cost.

It is still another object of the present invention to provide a compact disc dispenser which can store the cassette tape in a secure but convenient manner.

It is a further object of the present invention to provide a compact disc dispenser which is easy to operate.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
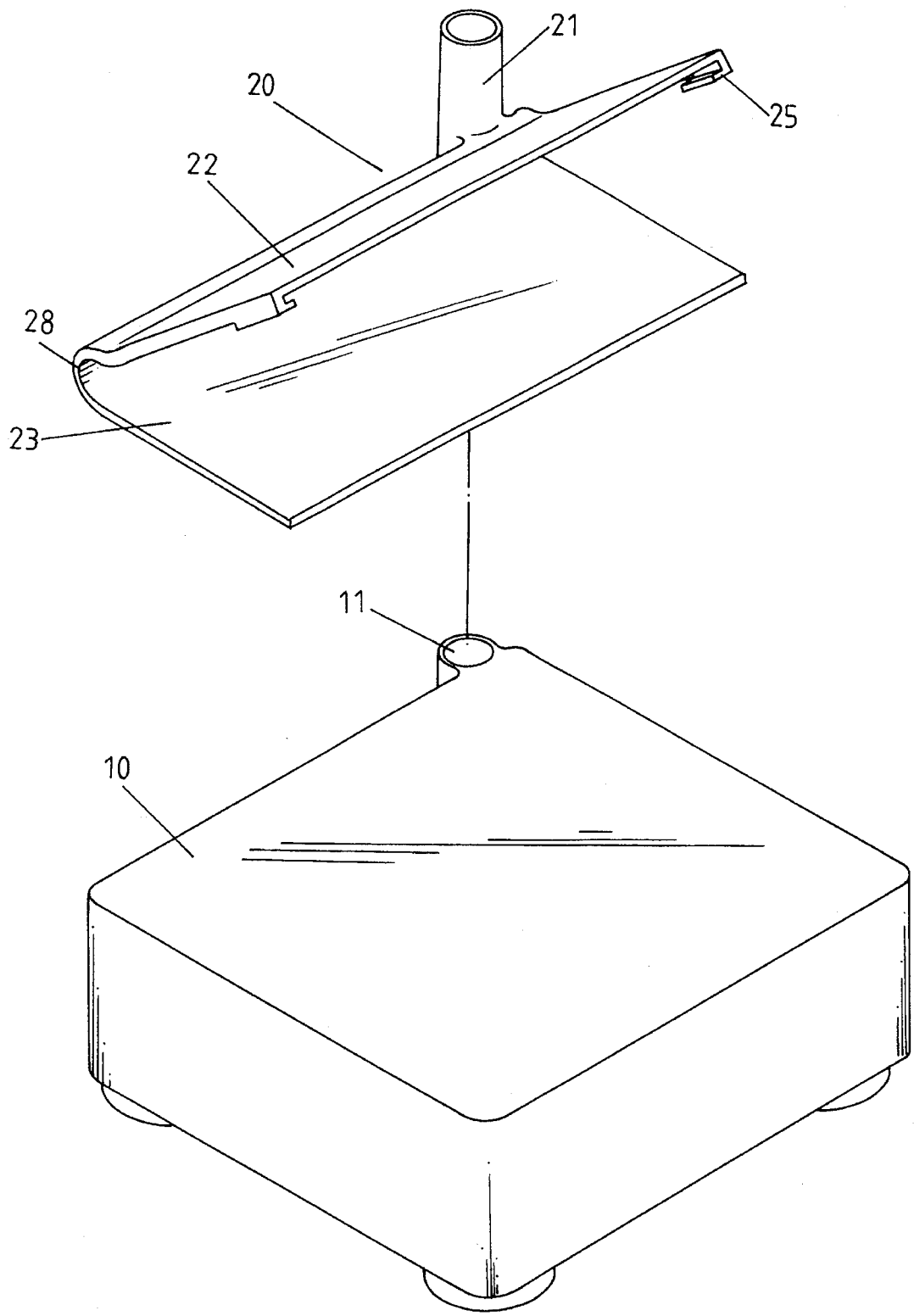
FIG. 1 is an exploded view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2A:
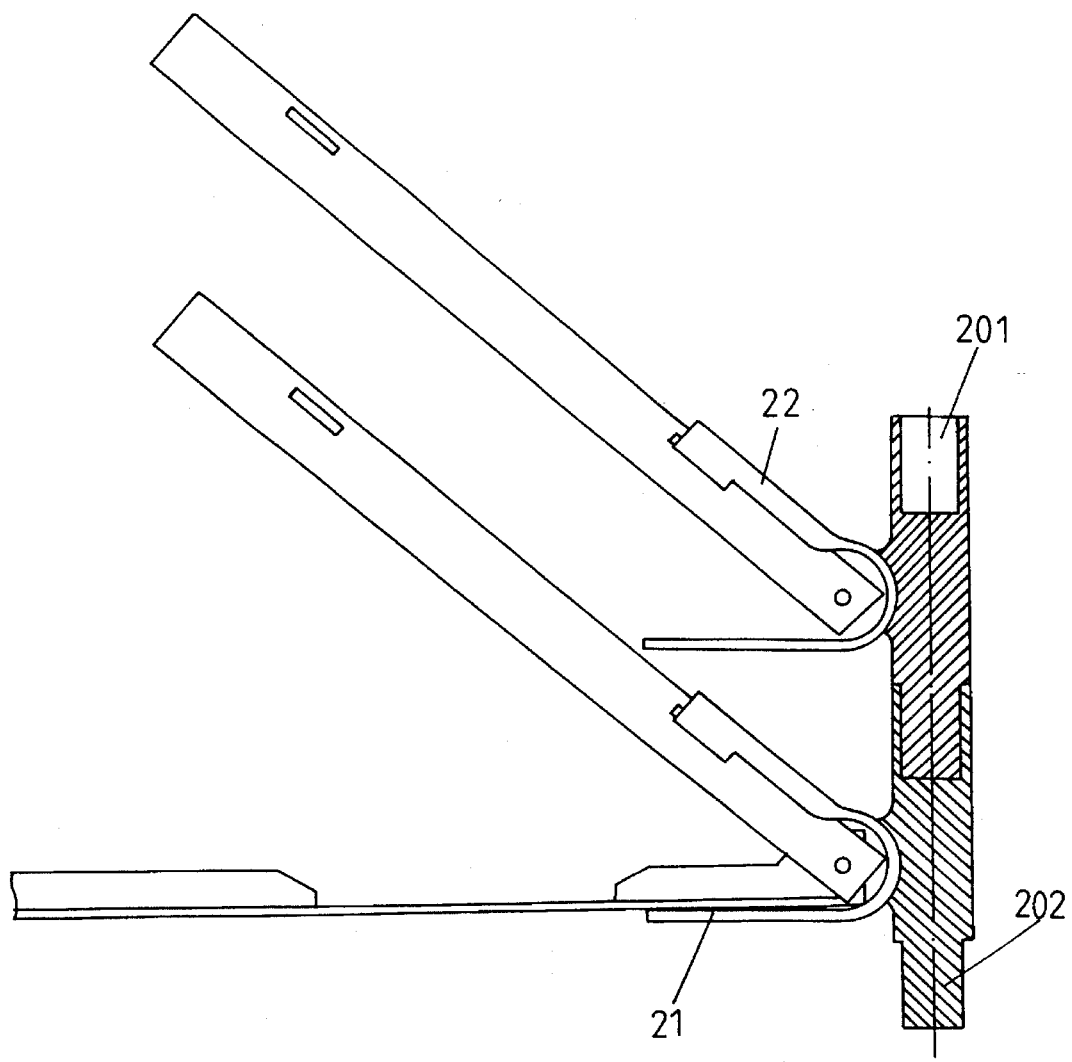
FIG. 2A shows the engagement between two holders.
Figure 2B:
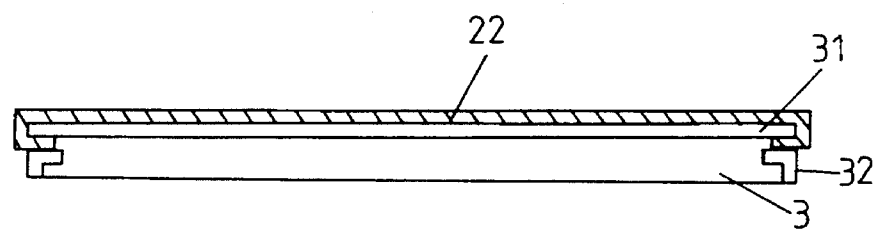
FIG. 2B is a sectional view of the holder.

With reference to the drawings and in particular to FIGS. 1, 2A and 2B thereof, the compact disc dispenser according to the present invention comprises a base 10 and a plurality of holders 20. The base 10 is formed with a hole 11 at an corner. The holder 20 includes a supporting plate 23 and a fixing plate 22 which is integral with and makes an acute angle with the supporting plate 23 so that there is an spine 28 between the supporting plate 23 and the fixing plate 22. In addition, the fixing plate 22 is formed at both sides with a hook portion 25 for engaging a cover 31 of a compact disc container 3. Moreover, the holder 20 is provided at an corner of the spine 28 with a axle 21 formed with a recess 201 at the upper end and a stem 202 at the lower end.

When in assembly, simply insert the stem 202 of the axle 21 of a first holder 20 into the hole 11 of the base 10 so that the holder 20 can be rotated with respect to the base 10. Then, insert the stem 202 of the axle 21 of another holder 20 into the recess 201 of the axle 21 of the first holder 20. Hence, a plurality of holders 20 can be mounted on the base 10.

Figure 3:
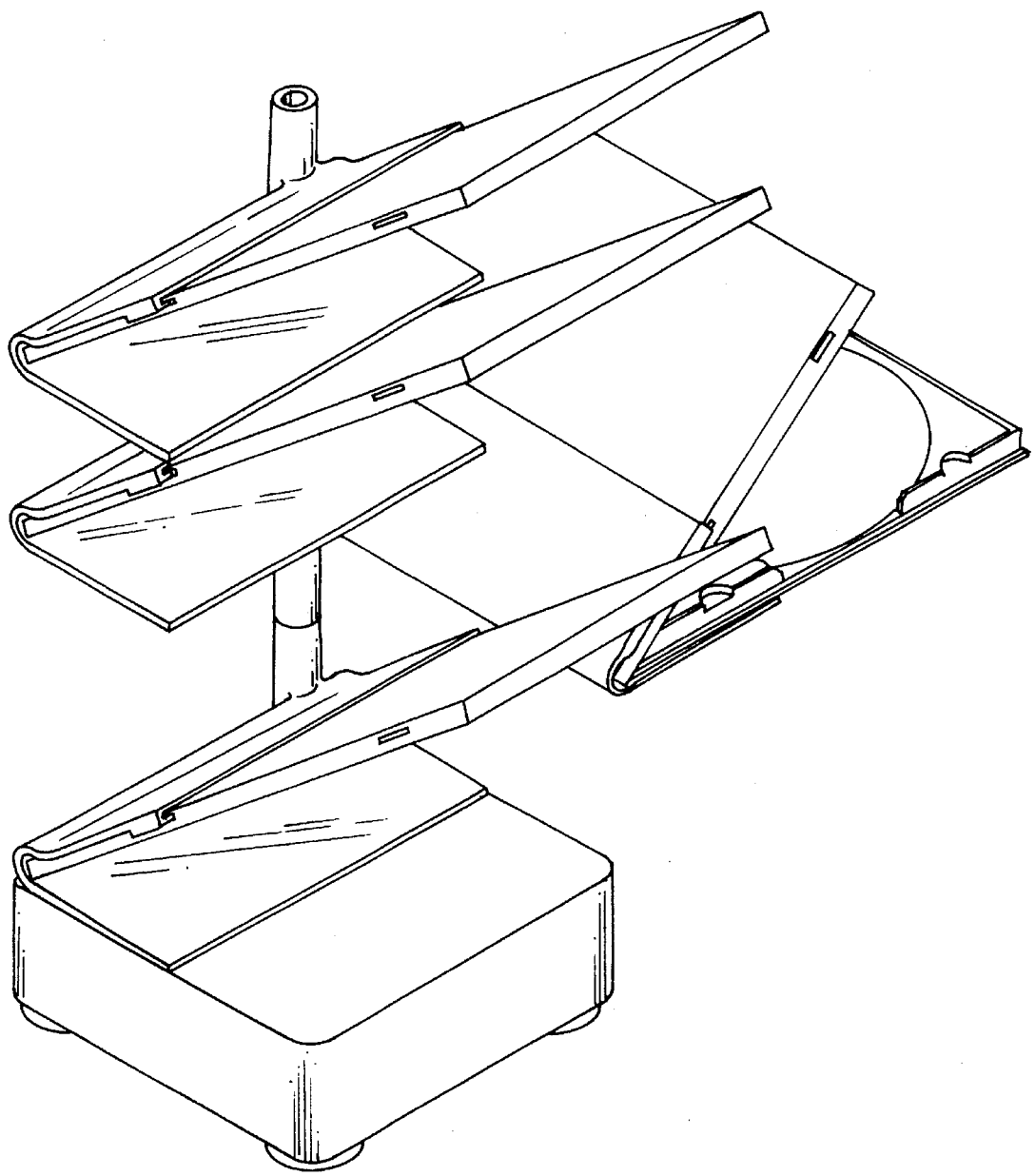
FIG. 3 is a working view of the present invention.

In use, simply engage the hook portions 25 of the fixing plate 22 of the holder 20 with the cover 31 of a compact disc container 3 so that it is only necessary to push down the body portion 32 of the compact disc container 3 to open the compact disc container 3 when desired to take the compact disc (not shown) out thereof. Furthermore, the holder 20 may be rotated to any desired position as required for convenience (see FIG. 3).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A compact disc dispenser comprising:

a base formed with a hole at an corner; and a plurality of holders each including a supporting plate and a fixing plate which is integral with and makes an acute angle with said supporting plate thereby forming a spine between said supporting plate and said fixing plate, said fixing plate being formed at both sides with a hook portion adapted for engaging a cover of a compact disc container, each of said holders being provided at an corner of said spine with an axle formed with a recess at an upper end and a stem at a lower end, the recess of one of said holders being adapted to receive the stem of another end of said holders.

* * * * *